United States Patent

[11] 3,577,175

[72] Inventors Norman I. Gri
Cincinnati;
Eugene T. Yon, Cleveland, Ohio
[21] Appl. No. 860,448
[22] Filed July 3, 1969
Division Ser. No. 723,994, Apr. 25, 1968, Pat. No. 3,483,096, Dec. 9, 1969.
[45] Patented May 4, 1971
[73] Assignee Avco Corporation
Cincinnati, Ohio

[54] INDIUM ANTIMONIDE INFRARED DETECTOR CONTACT

2 Claims, 12 Drawing Figs.

[52] U.S. Cl. .......... 317/237, 317/234
[51] Int. Cl. .......... H01l 15/06
[50] Field of Search .......... 317/237, 234, 234 (J,L,M,N)

[56] References Cited
UNITED STATES PATENTS

| | | | |
|---|---|---|---|
| 3,247,428 | 4/1966 | Perri et al. .......... | 317/234 |
| 3,371,213 | 2/1968 | Adams et al. .......... | 250/211 |
| 3,427,460 | 2/1969 | Kleinknecht .......... | 250/211 |
| 3,436,614 | 4/1969 | Nagatsu et al. .......... | 317/234 |
| 3,460,003 | 8/1969 | Hampikian et al. .......... | 317/234 |

*Primary Examiner*—James D. Kallam
*Attorney*—Charles M. Hogan

ABSTRACT: The invention here disclosed is an indium antimonide infrared detector having a novel contact region. The detector comprises a substrate, constituted of an N-material with a P-region fused thereon. An anodized surface oxide film is superimposed over the diffused P-region and over the adjacent surface of the substrate. A silicon oxide layer is disposed over most of the anodized surface oxide film but exposes a portion of the P-region which portion comprises superimposed layers of chromium and gold which form the contact region, said layers masking the contact area and rendering it insensitive to infrared radiation and simultaneously providing a pad to which an electrical connection may conveniently be made.

INVENTORS.
NORMAN J. GRI
BY EUGENE T. YON
Charles M. Hogan
ATTORNEY.

INVENTORS.
NORMAN J. GRI
EUGENE T. YON
BY Charles M. Hogan
ATTORNEY.

INDIUM ANTIMONIDE INFRARED DETECTOR CONTACT

This is a division of application Ser. No. 723,994, filed Apr. 25, 1968.

BACKGROUND OF THE INVENTION

The present invention relates to infrared detectors and specifically to a novel infrared detector. The infrared detector is of course the central element in any infrared detector system, performing as it does the function of transforming the incident energy in the photons of light into another form, in this case electrical. The detector may be made by the method described and claimed in our U.S. Pat. No. 3,483,096, dated Dec. 9, 1969.

The present invention is in the field of photodetectors. The photodetector is sensitive to and responsive to fluctuations in the number of incident photons.

The photodetector herein described utilizes the photovoltaic effect. That is, changes in the numbers of photons incident on a PN junction cause fluctuations in the voltage generated by the junction.

The detector here shown is first described on a simplified representative footing as comprising one junction of N-type material and P-type material, The principle and the structure are projected in practice and in the latter part of the description to a device comprising a rather extensive region or "-piece" of N-type material and several small regions or "-pieces" of P-type material diffused thereon, making up a plurality of junction, Thus, the detector assembly may contain a single PN junction or it may be comprised of a multiplicity of PN junctions arranged in a row-column array that is designed to complement the associated optics. The output from each junction represent the intensity in an elemental area of the scene being viewed. The stream of data resulting from an entire scan of the mosaic represents the entire scene. While the expression "piece" is herein used to refer to the P-material it will be understood that the P-material is diffused into the N-material.

The expression "N-type" material is here employed in the sense of a semiconductor into which a donor impurity has been introduced, so that it contains free electrons. The expression "P-type" material is used in the sense of a semiconductor material into which an acceptor impurity has been introduced, thus providing holes in the crystal lattice structure.

The invention is concerned with improvements in the construction and manufacture of indium antimonide detectors. Indium antimonide is described by Kruse, McGlaughlin and McQuistan in Elements of Infrared Technology (New York: Wiley, 1962), page 409, as a "compound semiconductor formed by melting together stoichiometric amounts of indium and antimony." Detectors have been made from indium antimonide (InSb) based upon the photoconductive effect, the photovoltaic effect, and the photoelectromagnetic effect.

The invention described presupposes the use of a high quality single crystal of indium antimonide. The material most commonly used in the practice of this invention has the following approximate characteristics:

0001 NO CARD FOR THIS ILLUSTRATION.

Doping levels ranging from $10^{14}$ to $10^{17}$ at 77° K. have been used for detectors. A value in the order of $10^{15}$ appears to be optimum.

OBJECTS OF THE INVENTION

The objects of the invention are to provide:

1. An improved detector array or mosaic having uniform output characteristics.
2. An improved ohmic contact for an infrared detector.
3. Ohmic contacts which make alignment of a detector array practical.
4. An improved detector array having deposited surface apertures.

5. An improved method of making a diode structure which includes the steps of restoring surface stoichiometry by anodization, mechanically protecting the passivation layer while reducing device capacitance and providing an antireflecting surface film and applying ohmic contacts which can operate at very low temperatures, and can withstand repeating cycling over a wide range of temperatures, while leaving an overlay pad for wire attachment, accurately defining active dimensions and providing a suitable aperture arrangement for spatial filtering.
6. An improved detector array having deposited surface apertures.

DESCRIPTION OF THE DRAWINGS

For a better understanding of the invention, together with other and further objects, advantages and capabilities thereof, reference is made to the following description of the drawings, in which:

FIG. 8 P-material in place
FIG. 9 detector elements passivated
FIG. 10 silicon dioxide in place
FIG. 11 cut out made for contact
FIG. 12 both chromium and gold deposits in place, ohmic contact made

DETAILED DESCRIPTION OF THE INVENTION

The description which follows shows a process for providing contacts in a detector which is made in accordance with the invention of Vernon L. Lambert and Norman J. Gri, disclosed and claimed in their copending U.S. Pat. application entitled "Improved Indium Antimonide Infrared Detector and Process for Making the Same," Ser. No. 724,684, filed Apr. 25, 1968, said patent application and invention being assigned to the same assignee, to-wit; Avco Corporation, as the present application and invention. The detailed description of the present invention is now prefaced by a brief description of the preparation of the junction detector per se, without contacts, in accordance with said copending patent application and the invention thereof.

Figure 1:
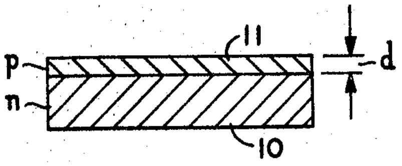
FIG. 1 is an elevational sectional view, showing a typical cross section of a PN junction.

Referring now to FIG. 1, there is shown a substrate of N-type material, i.e. InSb, with superimposed P-type material 11, formed by solid state diffusion of an acceptor element such as cadmium or zinc. Indium antimonide is described at pages 155 and 409 of the above-entitled "Elements of Infrared Technology" and the operation of an indium antimonide photovoltaic detector is discussed at page 410 of the same text.

In the making of detectors in accordance with the invention of the said copending patent application tellurium was added to the N-type material in order to increase the number of free electrons from $10^{13}$ per cubic centimeter to $10^{15}$ per cubic centimeter. The tellurium comprised donor impurities.

Figure 2:
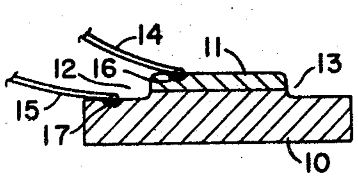
FIG. 2 is an elevational sectional view, showing a typical cross section of a conventional PN junction utilizing indium soldered connections.
Figure 3:
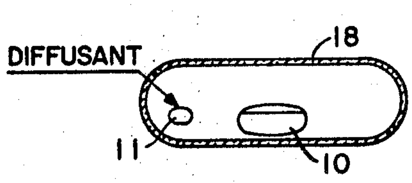
FIG. 3 is an outline drawing of an ampul apparatus used in a diffusion operation herein disclosed.

A mesa type junction detector is formed, according to the invention of the copending patent application, by etching away the excess material in the regions indicated at 12 and 13 in FIG. 2, leaving a plateau or mesa which is defined by a slope, appearing in cross section as shoulders 12 and 13. That is to say, when a mesa is formed, the P-type material and the adjacent portions of the N-type material project upwardly as a small rectangular plateau. In accordance with the prior art, contact is made with the P and N material respectively, by Indium soldering of conductors 14 and 15 respectively, thereto.

Figure 4:
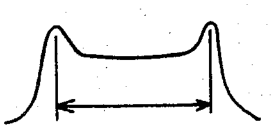
FIG. 4 is a curve showing the output characteristic of the FIG. 2 junction, the ordinates representing output values and the abscissae representing displacements.

Examination of FIG. 2 establishes that the P layer must be sufficiently thick in the prior art structure, to permit the indium soldered connections to be made at 14 and 15, as indicated at 16 and 17, respectively. The soldering operation involves alloying, which requires a relatively thick P layer. The inventors in the said copending patent application discovered that this requires gave rise to a difficulty which constitutes a disadvantage and limitation of the prior art. When a beam of infrared radiation was swept across a detector as illustrated in FIG. 4, the response was not a flat top wave, as is desired. On the contrary, when plotted on a framework of Cartesian coordinates, the resultant wave form showed that the surface of the detector is not at all uniform in its response. That is, when a microscopic ray of light is projected onto the surface of a photo-detector junction in accordance with FIG. 2, and when the photo response is recorded as a function of the position of the ray, it was found that the photo response is high as the ray traverses the region 12. The response decreases as the main portions of the mesa are traversed and it finally rises again in the region 13. The inventors in the said copending patent application addressed themselves to the problem of achieving a flat top response and eliminating the undesired discontinuity occurring at the shoulders 12 and 13, as per FIG. 4.

They conceived a direct process of manufacture of a junction having the desired uniform characteristics. The thickness of the P layer that they provided is from 1.0 to 0.5 micron.

In accordance with the invention of the copending patent application, a thin layer of a high concentration of acceptor material, cadmium or zinc, is diffused on the N material. An acceptor material is substance which has three valence electrons in its atom. When it is added to a semiconductor crystal it creates a positive mobile hole in the lattice structure of the crystal. The diffusion is so shallow that the conventional description of the concentration profile is not applicable thereto. The shallowness permits electron hole carriers to be collected even though the carrier electrical diffusion length is substantially reduced because of the lattice disruption caused by the diffusion.

The above process of the copending patent application is carried out by placing an indium antimonide wafer 10 in a sealed evacuated quartz ampul 18 approximately 1 inches in diameter and 6 inches in length, using as the diffusant a quantity of six 0.001 inches diameter spheres of cadmium. Diffusion is maintained for 4 hours at a temperature level of 400° C. Optionally, charges of antimony may be employed in order to prevent antimony evaporation.

Contact with the P material is provided in accordance with the present invention. Reference is now made to FIGS. 8—12, for a description of a complete detector incorporating contacts provided by the present invention in a detector made according to the invention of the said copending patent application.

Figure 5:
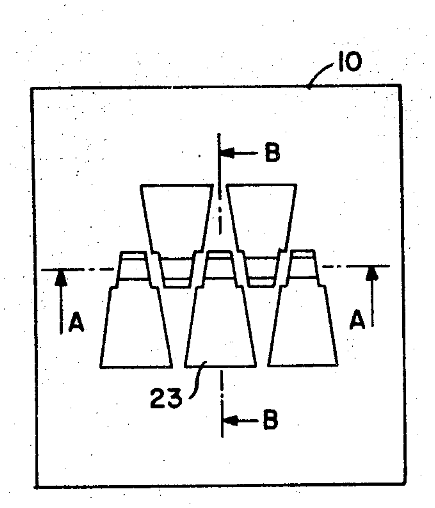
FIG. 5 is a plan view of a detector array in accordance with the invention.
Figure 6:
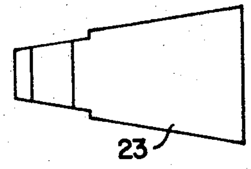
FIG. 6 is a top plan view of one of the detector elements of the FIG. 5 array.
Figure 8:
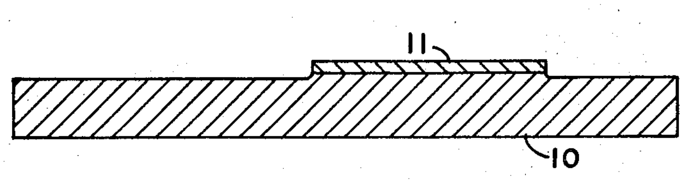
FIGS. 8—12 are elevational sectional views, showing typical cross sections of the detector work piece at the following stages of the fabrication process.

Specifically, as illustrated in FIG. 8, the present invention postulates that a substrate of N-type material 10 is previously formed into a junction with P-type material 11. Parenthetically, the finished product is a detector array which comprises a single piece of N material 10 and a number of mesas aligned along line AA as illustrated in FIG. 5.

Referring back to FIG. 8 it represents a cross section through a single mesa junction in the state which is achieved following solid state diffusion of P material on N material. At that stage the structure of FIG. 8, without passivation, would exhibit diode characteristics which should be improved. The etching which has been referred to above (i.e. the removal of P material beyond the bounds of the plateau) removes antimony and leaves the surface excessively rich in indium.

Figure 9:
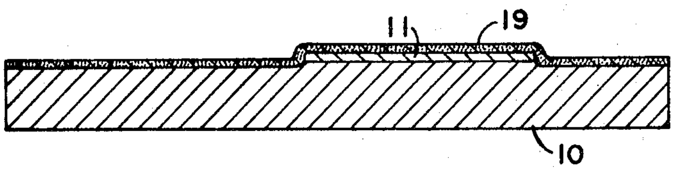

Since indium antimonide is fundamentally a compound semiconductor formed by melting together stoichiometric amounts of indium and antimony, it is necessary to regain the stoichiometric balance. This is accomplished by forming an anodized surface oxide in an alkali solution. The anodization is carried out in conventional manner using a solution of potassium hydroxide or a suitable solution containing the OH radical as the electrolyte. final film thickness of the oxide 19 is 1000A°. Oxide 19 is passive and is insoluble. This condition is illustrated in FIG. 9.

Figure 10:
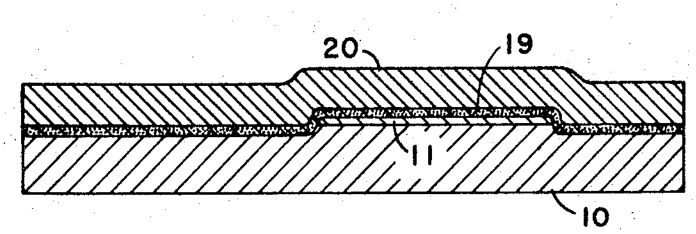

The oxide formed by anodization is characterized by extreme softness and a high dielectric constant. Accordingly, the film 19 is coated with a durable material in order to preclude mechanical damage by abrasion. That is to say, a thickness 20 of approximately 6000A° of silicon monoxide or silicon dioxide is applied by evaporation or by RF (radio frequency) sputtering or electron beam deposition. The completion of this stage is illustrated in FIG. 10. This film functions in three-fold fashion: (1) It serves as a protective coating over the anodized oxide; (2) it provides a low dielectric contact intermediate layer in order to reduce the parasitic capacitance of the device; and (3) it provides an antireflectance coating at 5 microns wave length.

Figure 11:
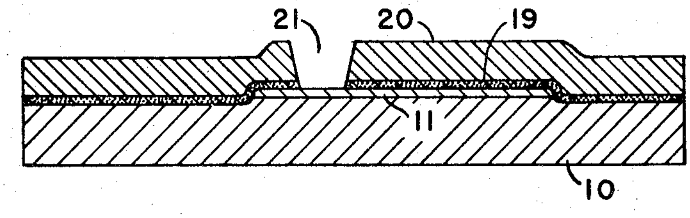

In order to make provision for the installation of an electrical contact in abutment with the P-region a cutout 21 is made, as by the use of conventional photolithographic techniques commonly employed in the fabrication of integrated circuits of the silicon variety. This stage is illustrated in FIG. 11.

The finalization of the process involves a two-step vacuum evaporation technique, for the provision of ohmic contacts and area definition. The substrate is heated to a high temperature, typically 180° C. and a thin layer of chromium 22, for example, 100°,is deposited on the substrate to form the ohmic contact and also to provide adherence to the dielectric surface. At the conclusion of this step, a heavy deposit of gold 23 is evaporated through a mask which contains the desired area definition of the final detector assembly.

Figure 7:
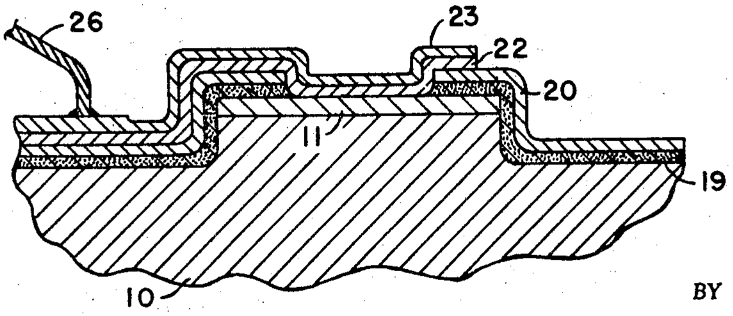
FIG. 7 is an elevational sectional view through a finished detector in accordance with the invention.

The gold layer 23 masks the contact area and renders it insensitive to infrared radiation. As best seen in FIG. 7 it provides pad, convenient paid, to which connection is made, as by a gold wire 26. This is preferably accomplished by ultrasonic welding techniques.

Figure 12:
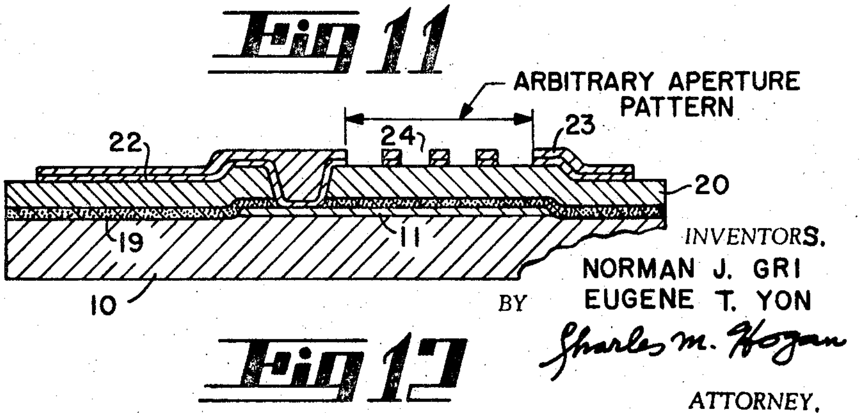

It will be observed in FIG. 12 that three cross sections of the chromium-gold layers are shown in an area which overlies the P-material and is designated 24. This area constitutes a grating or aperture pattern and its showing in FIG. 12 is suggestive of one of the many different gratings or cross sections which can be provided, the materials being masked on at the same time that the contacts are deposited.

Any desired aperture pattern may simultaneously be deposited, as indicated in FIG. 12, to provide for spatial frequency filtering. Suitable patterns are illustrated at pages 656—660 of the "Handbook of Military Infrared Technology" edited by William L. Wolfe of the Office of Naval Research, Superintendent of Documents, Washington, D.C., 1965.

Referring now specifically to FIG. 5, there is shown a detector array which comprises a series of contacts such as 23. Each one of these contacts converges into a contact which is superimposed on a mesa. It will be understood that the gold 23 is underlaid by chromium. A cross-sectional view taken along section line B–B of FIG. 5 would correspond to that portion of FIG. 12 which is to the left of the aperture pattern.

It will be understood that a plurality of contacts are made to the various P-regions in the array, five such contacts being illustrated in FIG. 5. On the other hand, a single contact (now shown) is made to the N-type material 10.

Among the advantages of the detector herein shown is a large reverse impedance on the order of one megohm.

Another advantage is the uniformity of the various junctions, as included in a detector array.

While there has been shown and described what is at present considered to be the preferred embodiment of the invention, it will be understood by those skilled in the art that various changes and modifications may be made therein without departing from the scope of the invention as defined in the appended claims.

We claim:

1. An infrared detector comprising an indium antimonide substrate comprising:

mass of N-material, a P-region diffused in said mass, an anodized surface oxide film superimposed over the P-region and the adjacent surface of the mass, a silicon oxide layer disposed over the anodized surface oxide film, said anodized surface oxide film and said silicon oxide layer being formed to expose at least a portion of the P-region and an ohmic contact with the P-region comprising a first layer of chromium and a second layer of gold, the thickness of the first layer being of the order of 100A°, the second layer being a connection means, said layers masking the contact area and rendering it insensitive to infrared radiation and simultaneously providing a convenient pad for external connections.

2. An infrared detector in accordance with claim 1 and a formation of gold mounted on the silicon oxide layer defining an aperture pattern.

PO-1050
(5/69)

UNITED STATES PATENT OFFICE
CERTIFICATE OF CORRECTION

Patent No. 3,577,175 Dated May 4, 1971

Inventor(s) Norman J. Gri and Eugene T. Yon

It is certified that error appears in the above-identified patent and that said Letters Patent are hereby corrected as shown below:

The correct name of inventor Gri is --- Norman J. Gri ---.

Col. 1, line 25, after "material" (second occurrence), there should be a period rather than a comma; column 1, line 30, "junction" should read --- junctions ---; column 1, line 34, "represent" should read --- represents ---. Column 1, line 60, instead of "0001 NO CARD FOR THIS ILLUSTRATION" insert ---

| | 77° K | Room Temperature |
|---|---|---|
| Carriers per cubic centimeter | $.8\text{-}3.1\times10^{15}$ | $10^{16}$ |
| Mobility in square centimeters per volt-second | $10^{5}$ or greater | $7 \times 10^{4}$ |

Column 3, line 9, "Indium" should read --- indium ---; column 3, line 17, "requires" should read --- requirement ---; column 3, line 52, "inches" should read --- inch ---; column 3, line 54, "inches" should read --- inch ---; column 4, line 24, "contact" should read --- constant ---; column 4, line 37, "100°"should read --- 100A° ---; column 4, line 44, should read --- vides a convenient pad to which connection is made, as by ---.

Claim 1, line 3 should read --- a mass of N material, ---.

Signed and sealed this 21st day of September 1971.

(SEAL)
Attest:

EDWARD M.FLETCHER,JR.
Attesting Officer

ROBERT GOTTSCHALK
Acting Commissioner of Patents